(12) United States Patent
Fujii (10) Patent No.: US 10,816,882 B2
(45) Date of Patent: Oct. 27, 2020

(54) WHEEL MEMBER

(71) Applicant: CASIO COMPUTER CO., LTD, Tokyo (JP)

(72) Inventor: Daijiro Fujii, Tokyo (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 0 days.

(21) Appl. No.: 16/204,618

(22) Filed: Nov. 29, 2018

(65) Prior Publication Data

US 2019/0171097 A1    Jun. 6, 2019

(30) Foreign Application Priority Data

Dec. 1, 2017   (JP) .................................. 2017-231362

(51) Int. Cl.

| | | |
|---|---|---|
| *F21V 17/06* | (2006.01) | |
| *G03B 21/20* | (2006.01) | |
| *H04N 9/31* | (2006.01) | |
| *G03B 33/08* | (2006.01) | |
| *G02B 26/00* | (2006.01) | |

(52) U.S. Cl.

CPC ........... *G03B 21/20* (2013.01); *G02B 26/008* (2013.01); *G03B 21/204* (2013.01); *G03B 33/08* (2013.01); *H04N 9/3114* (2013.01); *H04N 9/3158* (2013.01)

(58) Field of Classification Search
CPC .. G03B 21/2093; G03B 21/204; G03B 33/08; G02B 26/008; H04N 9/3158; H04N 9/3114

USPC .......................................................... 362/433
See application file for complete search history.

(56) References Cited

U.S. PATENT DOCUMENTS

| 7,176,967 B1* | 2/2007 | Dykaar ................ H04N 5/2254 |
| | | 348/262 |
| 2007/0081086 A1 | 4/2007 | Ingram |
| 2009/0273763 A1* | 11/2009 | Kjaer .................... G03B 21/14 |
| | | 353/84 |
| 2016/0073068 A1* | 3/2016 | Miyazaki ............. H04N 9/3111 |
| | | 353/31 |
| 2017/0127026 A1 | 5/2017 | Hsu |
| 2017/0127926 A1* | 5/2017 | Kuramoto ................ H04N 9/77 |

FOREIGN PATENT DOCUMENTS

| CN | 1797181 A | 7/2006 |
| CN | 105351887 A | 2/2016 |
| CN | 106597787 A | 4/2017 |
| JP | S63-220107 A | 9/1988 |
| JP | 2012-003213 A | 1/2012 |
| JP | 2013-047793 A | 3/2013 |

(Continued)

OTHER PUBLICATIONS

EPO; Application No. 18208494.7; Extended European Search Report dated Apr. 10, 2019.

(Continued)

*Primary Examiner* — Ali Alavi (74) *Attorney, Agent, or Firm* — Fitch, Even, Tabin & Flannery LLP (57) ABSTRACT

A wheel member including a wheel plate which transmits or reflects light and which is used in a rotating state, wherein the wheel plate has a center-of-gravity adjuster between flat surfaces of front and back surfaces of the wheel plate.

6 Claims, 5 Drawing Sheets

(56) References Cited

FOREIGN PATENT DOCUMENTS

| | | |
|---|---|---|
| TW | M274552 | 9/2005 |
| WO | 2016110888 A1 | 7/2016 |
| WO | 2016197888 A1 | 12/2016 |
| WO | 2017003629 A1 | 1/2017 |

OTHER PUBLICATIONS

JPO; Application No. 2017-231362; Notice of Reasons for Refusal dated Mar. 17, 2020.

* cited by examiner

WHEEL MEMBER

CROSS-REFERENCE TO RELATED APPLICATIONS

This application is based upon and claims the benefit of priority from Japanese Patent Application No. 2017-231362, filed on Dec. 1, 2017, the entire contents of which are incorporated herein by reference.

BACKGROUND

1. Field of the Invention

The present embodiment relates to a wheel member.

2. Description of Related Art

In the invention disclosed by JP2013047793 (A) (Patent Document 1) of a patent application which was filed in Japan, an apparatus such as a projector which performs projection by using light of a different color includes: an excitation light source which emits excitation light of a single color; and a wheel member which includes a fluorescent layer that receives the excitation light and emits fluorescent light of a color different from the color of the excitation light. The excitation light is emitted to the fluorescent layer of the wheel member and light of a predetermined color is taken out to form a projected image.

In order to adjust the position of center of gravity and keep a balance at the time of high-speed rotation, the wheel member described in Patent Document 1 is provided with a balance correction material having a liquid reservoir of adhesive on the surface thereof and suppresses the generation of vibration or the like.

However, since the wheel member of Patent Document 1 has the configuration of providing the balance correction material on the flat surface, there has been a problem that unevenness (concave and/or convex) due to the balance correction member occurs and noise of wind noise is generated at the time of rotation of the wheel member.

The present embodiment has been made in consideration of the above problem, and an object of the present embodiment is to provide a wheel member which keeps a good balance and can suppress the generation of noise.

SUMMARY

In the present embodiment, there is provided a wheel member including a wheel plate which transmits or reflects light and which is used in a rotating state, wherein the wheel plate has a center-of-gravity adjuster between flat surfaces of front and back surfaces of the wheel plate.

According to the present embodiment, it is possible to provide a wheel member which keeps a good balance and can suppress the generation of noise.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein.

DETAILED DESCRIPTION

Hereinafter, the present embodiment will be described by using the drawings. Though the embodiment described below is provided with various limitations which are technically preferred, the scope of the present invention is not limited to the following embodiment and the illustrated example.

Figure 1:
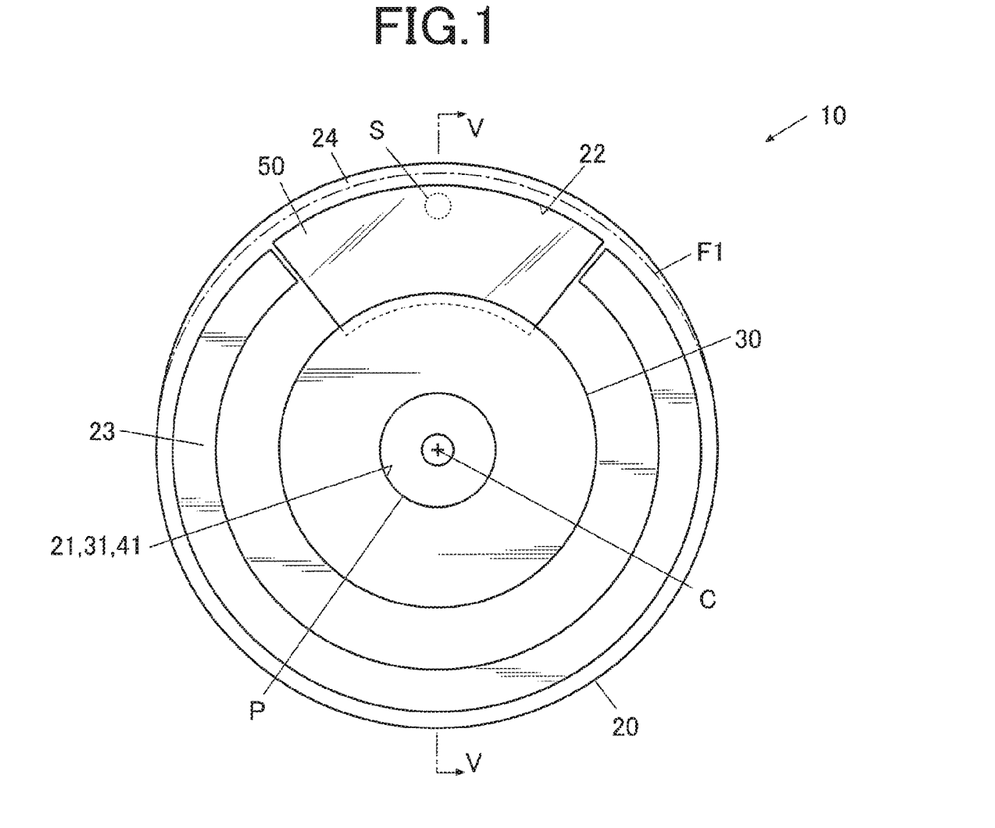
FIG. 1 is a front view of a fluorescent wheel according to an embodiment.
Figure 2:
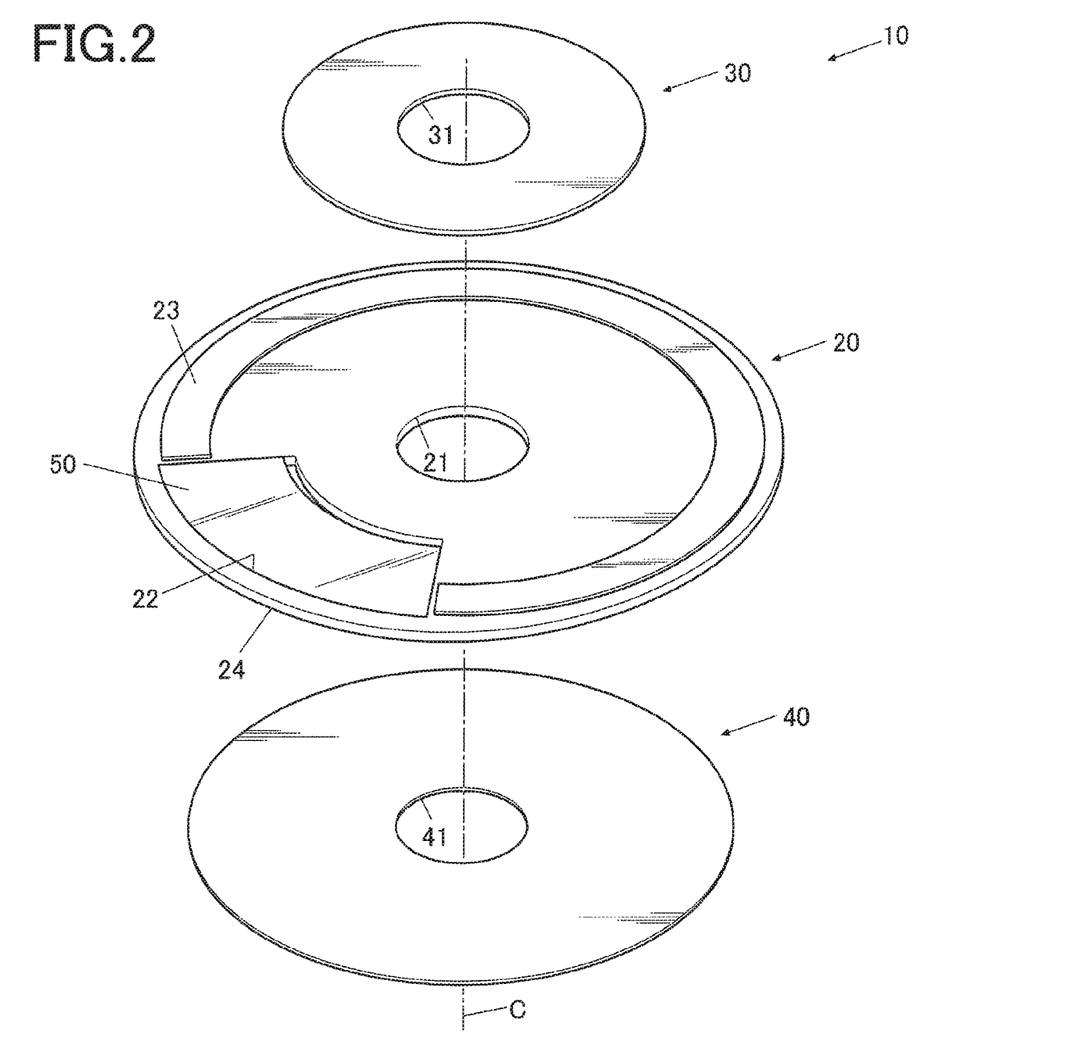
FIG. 2 is an exploded perspective view of the fluorescent wheel.
Figure 3:
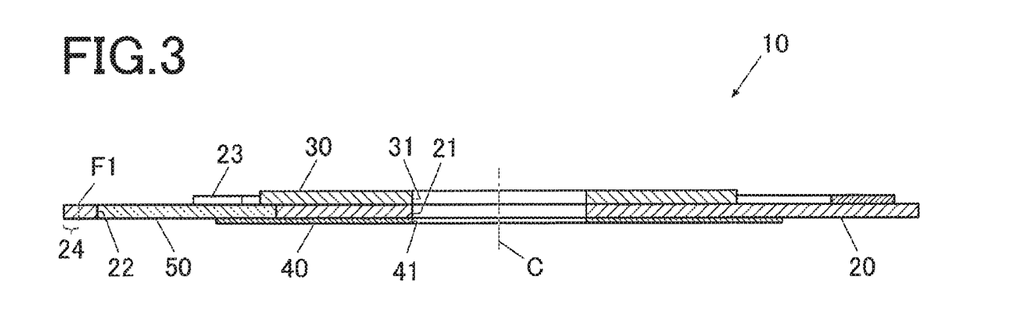
FIG. 3 is a sectional view showing the plane along V-V line shown in FIG. 1 when seen in the arrow direction.

FIG. 1 is a plan view of a fluorescent wheel 10 as a wheel member incorporated into a light projection system of a projector, FIG. 2 is an exploded perspective view of the fluorescent wheel 10, and FIG. 3 is a sectional view along V-V line of FIG. 1.

[Schematic Configuration of Fluorescent Wheel]

The fluorescent wheel 10 performs conversion of excitation light of a predetermined color (predetermined wavelength band) emitted from a light source of the projector into light of a same color having a convergence lower than that of the excitation light, and performs conversion of the excitation light into light of a different color (different wavelength band).

The fluorescent wheel 10 is in a circular plate shape as a whole. A rotation shaft P which is rotated by a spindle motor is mounted to be fixed to a central hole penetrating the center of the fluorescent wheel 10, and a rotation force is provided via the rotation shaft P.

The fluorescent wheel 10 includes: a wheel plate 20 in a nearly circle; a hub 30 as a circular plate mounted on one surface of the wheel plate 20; a holding plate 40 as a circular plate mounted on the other surface of the wheel plate 20; and a diffusion plate 50 as a transmitting member mounted on the wheel plate 20.

As for the above fluorescent wheel 10, wheel plate 20, hub 30, holding plate 40 and diffusion plate 50, the surface on the front side of the sheet of FIG. 1 is referred to as a front surface, and the surface on the opposite side is referred to as a back surface.

[Wheel Plate]

The wheel plate 20 is a circular plate in a nearly circle made of metal such as a copper plate, aluminum plate and stainless plate.

The wheel plate 20 has, as shown in FIGS. 1 to 3, a uniform thickness as a whole, and there is formed a central hole 21 penetrating the central portion from the front surface to the back surface. The central hole 21 forms a central hole of the fluorescent wheel 10 which was mentioned above.

When the fluorescent wheel 10 is used, the rotation shaft is inserted therethrough to provide rotation. In the wheel plate 20, the portion forming the central hole 21 is a central portion, and the center of the central hole 21 is a rotation center C of the fluorescent wheel 10.

The front and back surfaces of the wheel plate 20 are perpendicular to the rotation central line running through the rotation center C.

An opening 22 penetrating from the front surface to the back surface is formed around the outer circumference of the wheel plate 20. The diffusion plate 50 is disposed inside the opening 22.

This opening 22 is formed in an arc around the above-mentioned rotation center C as a center. The opening 22 is open in a range not reaching 90 degrees with respect to the circumference direction.

The radius of the outer circumference of the opening 22 is smaller than the outer circumference of the wheel plate 20, and the radius of the internal circumference is smaller than the radius of the after-mentioned hub 30.

The surface of the wheel plate 20 is subjected to the mirror polishing process, silver vapor deposition process and other mirror surface processes, to form a reflection surface. The fluorescent layer 23 in an arc band around the above-mentioned rotation center C as a center is formed over the entire angle range in the rotation circular direction other than the opening 22 around the outer circumference of the wheel plate 20. The radius of the outer circumference of the fluorescent layer 23 nearly matches the radius of the outer circumference of the opening 22, and the radius of the internal circumference of the fluorescent layer 23 is larger than the radius of the internal circumference of the opening 22 and the radius of the hub 30.

The fluorescent layer 23 is obtained by diffusing the fluorescent body to a transparent binder (for example, ceramic binder, resin binder and silicon binder).

When the excitation light of a predetermined color (predetermined wavelength band) enters the fluorescent layer 23 from the light source, the fluorescent layer 23 is excited by the excitation light, and emits fluorescent light of a color different from the color of the excitation light. The wavelength band of the excitation light is not especially limited, and the embodiment includes a case where the excitation light is visible light of a single color. As long as the color of the fluorescent light emitted from the fluorescent layer 23 is different from the color of the excitation light, the wavelength band of the fluorescent light is not especially limited. The embodiment includes a case of selecting the fluorescent body of visible light of a single color. In the embodiment, the color of the excitation light is any of light's three primary colors, and the fluorescent body is selected such that the color of the fluorescent light emitted from the fluorescent layer 23 is another color among light's three primary colors. For example, the excitation light is light in the wavelength band of a blue color, and the fluorescent body is selected such that the fluorescent light emitted from the fluorescent layer 23 is light in the wavelength band of a green color.

Though the fluorescent layer 23 is formed over the entire range of the circumferential band excluding the opening 22, the fluorescent layer 23 may be formed in a partial range of the circumferential band excluding the opening 22. In such a case, a reflection prevention layer is formed in the range other than the fluorescent layer 23 in the circumferential band excluding the opening 22.

The fluorescent layer 23 may be divided into a plurality of layers in the rotation circumferential direction to form fluorescent layers having different fluorescent colors. It is sufficient that the color of fluorescent light emitted from each fluorescent layer is different from the color of the excitation light, and the embodiment includes a case of visible light of a single color.

As for the formation range of the fluorescent layer 23, a concave in an arc band may be formed on the front side of the wheel plate 20 to form the fluorescent layer 23 therein. In such a case, it is desirable that the surface of the wheel plate 20 is integrally smoothed so that the fluorescent layer 23 is flush with the surface of the wheel plate 20. In such a case, it is necessary to perform the mirror surface process to the bottom surface of the concave.

As shown in FIG. 1, the wheel plate 20 has a center-of-gravity adjuster 24 between flat surfaces of the front and back surfaces. The center-of-gravity adjuster 24 has a configuration not generating unevenness with respect to the front and back surfaces of the wheel plate 20, and the center-of-gravity adjuster 24 is provided on the opening 22 side with respect to the rotation center C in the outer circumference of the wheel plate 20.

The center-of-gravity adjuster 24 is formed of an outer circumference portion which is farther from the rotation center C than the other portion of the outer circumference.

That is, when the shape of the outer circumference of the wheel plate 20 is seen from the rotation central line direction, the half on the opposite side to the opening 22 with respect to the rotation center C has the outer circumference shape of an exact circle, and the half on the opening 22 side has the outer circumference shape of an oval.

The one-dot chain line F1 in FIG. 1 shows the exact circle with the rotation center C as a center. As seen from FIG. 1, the outer circumference shape of the half on the opening 22 side of the wheel plate 20 is such that the position closest to the central position in the circumferential direction of the opening 22 is farthest from the rotation center C.

The distance from the rotation center C gradually decreases from this position so as to be close to the radius of the above-mentioned exact circle.

As mentioned above, the diffusion plate 50 is housed in the opening 22 of the wheel plate 20, and the diffusion plate 50 is formed of glass or the like which has a density smaller than that of the material (predetermined metal) of the wheel plate 20.

Thus, the outer circumference shape of the half on the opening 22 side of the wheel plate 20 is the above-mentioned oval so as not to lose the balance due to lightening of the opening 22 side in the fluorescent wheel 10.

That is, the position of the center of gravity of the wheel plate 20 is adjusted to be on the rotation center C to adjust the balance at the time of rotation by the weight of the center-of-gravity adjuster 24 formed of the portion extending outward in the radius direction from the one-dot chain line F1 in the wheel plate 20.

[Diffusion Plate]

The diffusion plate 50 transmits the excitation light so as to be diffused. For example, the diffusion plate 50 is obtained by distributing fine particles or fine pores inside a translucent plate formed of glass or the like which is clear and colorless. Or, the diffusion plate 50 is obtained by forming minute unevenness on the surface of the clear and colorless translucent plate. Accordingly, the convergence of excitation light which passed through the diffusion plate 50 is lower than that of the excitation light before passing through the diffusion plate 50.

As shown in FIGS. 1 to 3, the diffusion plate 50 is disposed inside the opening 22 of the wheel plate 20. Thus, the shape of the diffusion plate 50 is an arc shape which nearly matches the shape of the opening 22.

The diffusion plate 50 is formed to have a thickness which is nearly equal to that of the wheel plate 20. In a state in which the diffusion plate 50 is disposed in the opening 22, the generation of the unevenness is suppressed as much as possible between the wheel plate 20 and the diffusion plate 50.

In the vertical direction to the wheel plate 20, the diffusion plate 50 inside the opening 22 is held from both sides by the hub 30 and the holding plate 40. A part of the flat surface of the diffusion plate 50 may be fixed by being bonded to one or both of the hub 30 and the holding plate 40.

[Holding Plate]

As shown in FIGS. 2 and 3, the holding plate 40 is bonded to the back surface side of the wheel plate 20 so as to be fixed.

The holding plate 40 is a circular plate made of metal such as copper plate, aluminum plate, stainless plate and others, and the outside diameter of the holding plate 40 is slightly smaller than that of the internal circumference of the fluorescent layer 23 of the wheel plate 20. The holding plate 40 has a uniform thickness as a whole.

At the center of the holding plate 40, a central hole 41 which penetrates the holding plate 40 from the front surface to the back surface is formed.

The central hole 41 forms a central hole of the fluorescent wheel 10 which was mentioned above, and the rotation shaft P is inserted when the fluorescent wheel 10 is used.

The central hole 41 of the holding plate 40 has a same radius as that of the central hole 21 of the wheel plate 20, and the holding plate 40 is bonded to the wheel plate 20. The outer circumference shape of the holding plate 40 is an exact circle with the rotation center C as a center. Furthermore, the flat plate surface of the holding plate 40 is perpendicular to the rotation central line running through the rotation center C.

The outside diameter of the holding plate 40 is smaller than that of the internal circumference of the fluorescent layer 23 of the wheel plate 20, but larger than the internal circumference of the opening 22. Accordingly, the holding plate 40 can be superposed on the internal circumference side of the diffusion plate 50 and support the diffusion plate 50 from the back surface side well.

Though the holding plate 40 is superposed on the internal circumference side of the diffusion plate 50, the outside diameter of the holding plate 40 is smaller than that of the internal circumference of the fluorescent layer 23. The excitation light emitted during rotation of the fluorescent wheel 10 is emitted to the position between the internal circumference and the external circumference of the fluorescent layer 23 with respect to the radius direction with the rotation center C as a center. Thus, the holding plate 40 is configured such that, even in a case where the excitation light enters the diffusion plate 50, the transmitted diffusion light is not shielded.

[Hub]

As shown in FIGS. 1 to 3, the hub 30 is bonded to the surface side of the wheel plate 20 so as to be fixed.

The hub 30 is a circular plate made of metal such as copper plate, aluminum plate, stainless plate and others, and the outside diameter of the hub 30 is smaller than that of the holding plate 40. The hub 30 has a uniform thickness as a whole.

At the center of the hub 30, a central hole 31 penetrating the hub 30 from the front surface to the back surface is formed. The central hole 31 forms the central hole of the above-mentioned fluorescent wheel 10, and the rotation shaft P is inserted when the fluorescent wheel 10 is used. The central hole 31 of the hub 30 has a same radius as that of the central hole 21 of the wheel plate 20, and the hub 30 is bonded to the wheel plate 20. The outer circumference shape of the hub 30 is an exact circle with the rotation center C as a center. Furthermore, the flat plate surface of the hub 30 is perpendicular to the rotation central line running through the rotation center C.

Since the outside diameter of the hub 30 is smaller than that of the holding plate 40, the outside diameter of the hub 30 is naturally smaller than the internal circumference of the fluorescent layer 23 of the wheel plate 20, but larger than the internal circumference of the opening 22. Accordingly, the hub 30 can be superposed on the internal circumference side of the diffusion plate 50 and support the diffusion plate 50 from the front surface side well. Though the hub 30 is superposed on the internal circumference side of the diffusion plate 50, the outside diameter of the hub 30 is smaller than that of the internal circumference of the fluorescent layer 23. Thus, even in a case where the excitation light enters the diffusion plate 50, the transmitted diffusion light is not shielded.

[Use Operation of Fluorescent Wheel]

The use operation of the fluorescent wheel 10 will be described. When the fluorescent wheel 10 is used, as mentioned above, the rotation shaft P is mounted to the central hole so as to be fixed, and the rotation drive is performed by the spindle motor. The excitation light is emitted to a predetermined emission position S (see FIG. 1) inside the region of the circumference band including the fluorescent layer 23 with the optical axis along the direction parallel to the rotation central line from the front surface side with respect to the fluorescent wheel 10 which is rotating.

When the excitation light passes through the opening 22 of the wheel plate 20 during rotation of the fluorescent wheel 10, the excitation light enters the diffusion plate 50 and passes through the diffusion plate 50 so as to be diffused.

Thus, the excitation light is converted into transmission light which has convergence/directionality lower than that of the excitation light by the diffusion plate 50. The optical axis of the transmission light (the optical axis of the transmission light is a virtual line extending from the diffusion plate 50 in the direction of the largest luminance) is obtained by extending the optical axis of the excitation light. At this time, the color of the transmission light is same as the color of the excitation light (for example, blue).

When the excitation light enters the fluorescent layer 23 during rotation of the fluorescent wheel 10, the fluorescent layer 23 is excited by the excitation light, and fluorescent light of a color different from that of the excitation light is emitted from the fluorescent layer 23 (for example, green). Even if a part of the excitation light passes through the fluorescent layer 23, the excitation light is reflected by the surface of the hub 30, the fluorescent layer 23 is excited by the reflection light, and the fluorescent light is emitted from the fluorescent layer 23. Thus, the excitation light is converted into the fluorescent light of a color different from that of the excitation light by the fluorescent layer 23. The fluorescent light emitted from the fluorescent layer 23 is a diffusion light which has low convergence/directionality. The optical axis of the fluorescent light (the optical axis of the fluorescent light is a virtual line extending in the direction of the largest luminance from the fluorescent layer 23) is parallel with the rotation central line of the fluorescent wheel 10, and directed opposite to the optical axis of the excitation light.

In such a way, it is possible to take out the fluorescent light of a different color by making the excitation light individually enter the fluorescent layer 23 and the diffusion plate 50 of the rotating fluorescent wheel 10.

[Technical Effect of Embodiment of Invention]

The above fluorescent wheel 10 has a center-of-gravity adjuster 24 between flat surfaces of the front and back surfaces of the wheel plate 20. Thus, even in a case where the opening 22 is formed in the wheel plate 20 and the diffusion plate 50 is housed therein, it is possible to make adjustment so that the center of gravity of the entire fluorescent wheel 10 is on the rotation central line running through the rotation center C or close to the rotation central line by the center-of-gravity adjuster 24. By such adjustment, a good balance of the center of gravity of the fluorescent wheel 10 is kept, and thus, it is possible to effectively reduce the generation of vibration at the time of rotation.

Furthermore, the center-of-gravity adjuster 24 is provided between the flat surfaces of the front and back surfaces of the wheel plate 20 and does not generate unevenness in the direction along the rotation center C. Thus, it is possible to suppress the generation of wind noise and achieve silence even at the time of high-speed rotation.

The center-of-gravity adjuster 24 is an outer circumference portion which is provided on the opening 22 side with respect to the rotation center C in the outer circumference of the wheel plate 20 and farther from the rotation center C than the other portion of the outer circumference.

Accordingly, it is possible to achieve the above effect by only changing the outer circumference shape of the wheel plate 20 and provide a fluorescent wheel 10 which can be produced easily.

Figure 4:
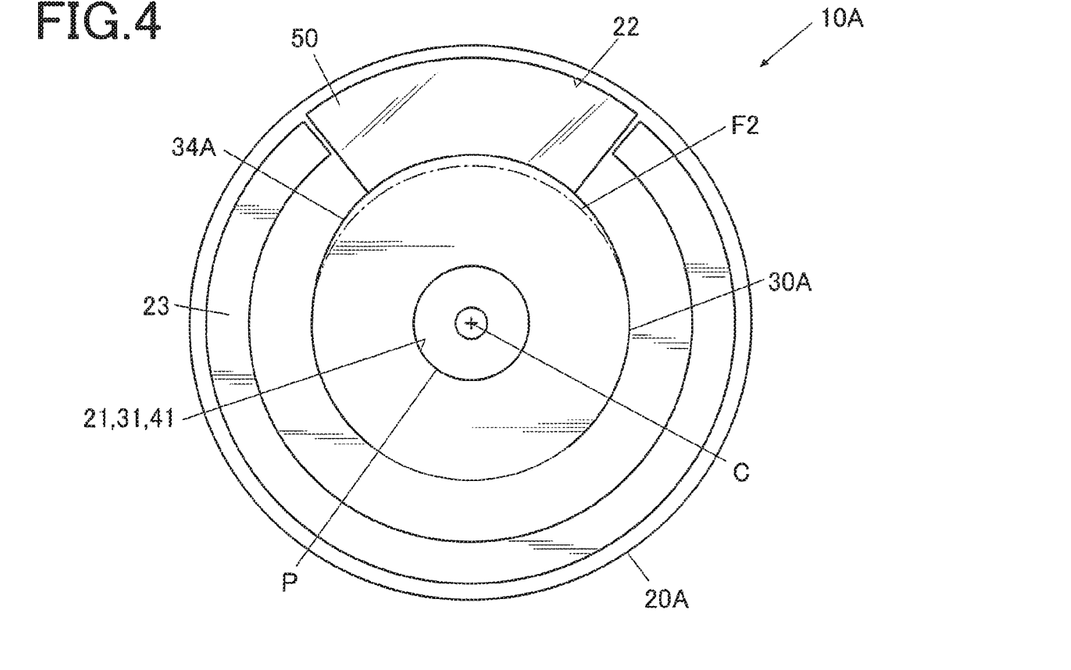
FIG. 4 is a front view of a fluorescent wheel according to a modification example of the embodiment.

FIG. 4 shows a plan view of a fluorescent wheel 10A as a wheel member that is a modification example of the embodiment.

As for the fluorescent wheel 10A, the difference from the above-mentioned fluorescent wheel 10 will be mainly described, and same reference numerals are provided to same parts to avoid repetition of the description.

The fluorescent wheel 10A includes a wheel plate 20A in which a central hole 21 and an opening 22 are formed, a hub 30A as a circular plate which is mounted on one surface of the wheel plate 20A, a holding plate 40 and a diffusion plate 50 (illustration of the holding plate 40 is omitted in FIG. 4).

In the fluorescent wheel 10A, the outer circumference shape of the wheel plate 20A is an exact circle with a rotation center C as a center. The fluorescent wheel 10A does not have the center-of-gravity adjuster 24.

Instead of the center-of-gravity adjuster 24, the hub 30A has a center-of-gravity adjuster 34A between flat surfaces of the front and back surfaces of the hub 30A.

The center-of-gravity adjuster 34A is provided on the opening 22 side of the wheel plate 20A with respect to the rotation center C in the outer circumference of the hub 30A.

The center-of-gravity adjuster 34A is a structure of not generating unevenness on the front and back surfaces of the hub 30A. The center-of-gravity adjuster 34A is formed of an outer circumference located farther from the rotation center C than the other portion of the outer circumference of the hub 30A. That is, when the outer circumference shape of the hub 30A is seen from the rotation central line direction, the outer circumference shape of the half on the side opposite to the opening 22 of the wheel plate 20A with respect to the rotation center C is an exact circle, and the outer circumference shape of the half on the opening 22 side is an oval.

The one-dot chain line F2 in FIG. 4 shows the exact circle with the rotation center C as a center. As seen from FIG. 4, in the outer circumference shape of the half on the opening 22 side of the wheel plate 20A in the hub 30A, the position closest to the central position in the circumference direction of the opening 22 is farthest from the rotation center C.

In such a way, the outer circumference shape of the half on the opening 22 side of the wheel plate 20A in the hub 30A is the above-mentioned oval shape, and adjustment is performed so that the position of the center of gravity of the fluorescent wheel 10A is located on the rotation center C by the weight of the center-of-gravity adjuster 34A formed of the portion extending outward in the radius direction from the one-dot chain line F2 of the hub 30A, and balance at the time of rotation is adjusted.

Thus, the center of gravity of the fluorescent wheel 10A can be located on or closer to the rotation center C, and it is possible to effectively reduce the generation of vibration at the time of rotation and obtain silence.

The above effect can be achieved only by changing the outer circumference shape of the hub 30A, and it is possible to provide the fluorescent wheel 10A which can be produced easily.

The same structure as that of the center-of-gravity adjuster 34A may be provided on the opening 22 side of the wheel plate 20A in the outer circumference of the holding plate 40, not the hub 30A. Alternatively, the same structure as that of the center-of-gravity adjuster 34A may be provided to both of the hub 30A and the holding plate 40.

Figure 5:
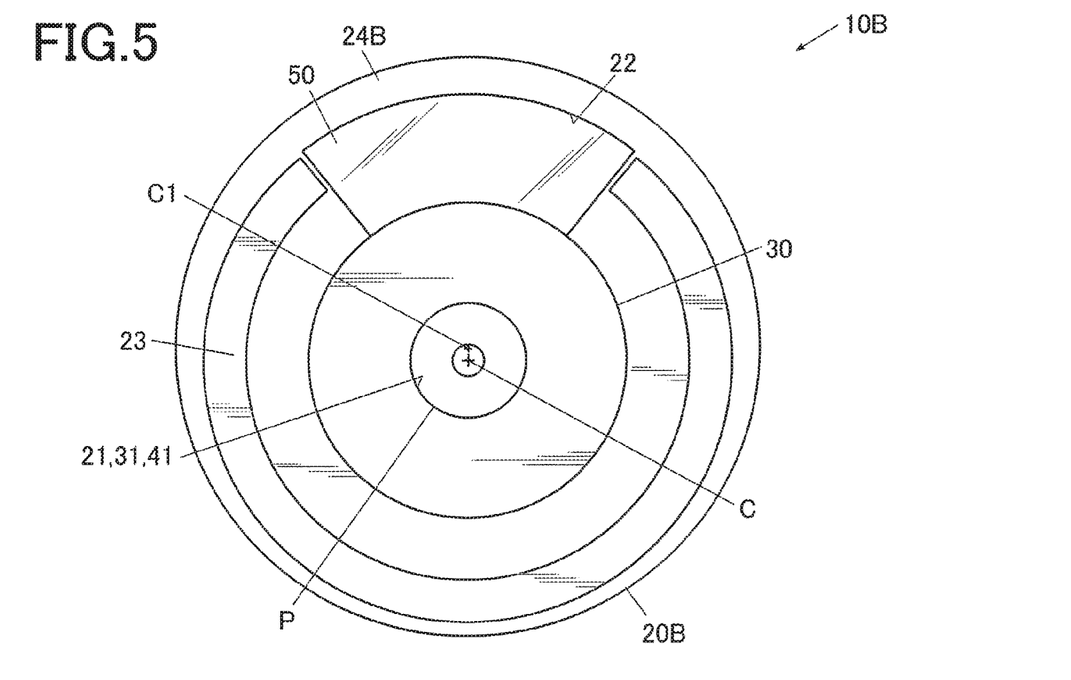
FIG. 5 is a front view of a fluorescent wheel according to a modification example of the embodiment.

FIG. 5 shows a plan view of a fluorescent wheel 10B as a wheel member that is a modification example of the embodiment. As for the fluorescent wheel 10B, the difference from the above-mentioned fluorescent wheels 10 and 10A will be mainly described, and same reference numerals are provided to same parts to avoid repetition of the description.

The fluorescent wheel 10B includes a wheel plate 20B in which a central hole 21 and an opening 22 are formed, a hub 30, a holding plate 40 and a diffusion plate 50 (illustration of the holding plate 40 is omitted in FIG. 5).

The outer circumference shape of the wheel plate 20B is an exact circle when seen from a rotation central line direction running through the rotation center C. The rotation center C is shifted to the side opposite to the opening 22 with respect to the center C1 of the wheel plate 20B.

The central hole 21, the opening 22 and the fluorescent layer 23 of the wheel plate 20B have shapes and arrangements with the rotation center C as a center for the functions thereof. The hub 30 and the holding plate 40 are also disposed with the rotation center C as a center.

By shifting the rotation center C from the center C1 of the wheel plate 20B, an outer circumference portion which is located farther from the rotation center C than the other portion of the outer circumference is formed on the opening 22 side of the wheel plate 20B. The outer circumference portion functions as the center-of-gravity adjuster 24B.

In such a way, the fluorescent wheel 10B forms a center-of-gravity adjuster 24B on the opening 22 side of the wheel plate 20B by shifting the rotation center C from the center C1 of the wheel plate 20B. The center-of-gravity adjuster 24B is provided between flat surfaces of the front and back surfaces of the wheel plate 20B, and has a shape not generating unevenness.

Thus, the center of gravity of the fluorescent wheel 10B can be located on or closer to the rotation center C, and it is possible to effectively reduce the generation of vibration at the time of rotation, and obtain silence.

Since the above effect can be achieved only by shifting the rotation center C, the wheel plate 20B can be formed from a circular plate of an exact circle. Thus, it is possible to provide the fluorescent wheel 10B which can be produced easily.

Figure 6:
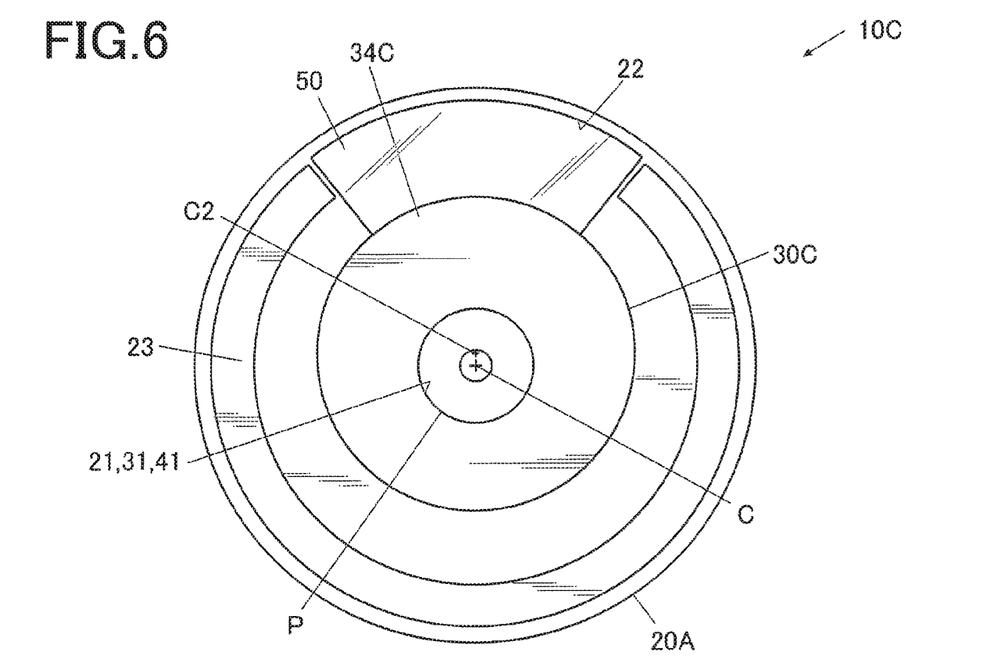
FIG. 6 is a front view of a fluorescent wheel according to a modification example of the embodiment.

FIG. 6 shows a plan view of a fluorescent wheel 10C as a wheel member that is a modification example of the embodiment.

As for the fluorescent wheel 10C, the difference from the above-mentioned fluorescent wheels 10 to 10B will be mainly described, and same reference numerals are provided to same parts to avoid repetition of the description.

The fluorescent wheel 10C includes a wheel plate 20A, a hub 30C as a circular plate which is mounted on one surface of the wheel plate 20A, a holding plate 40 and a diffusion plate 50 (illustration of the holding plate 40 is omitted in FIG. 6).

The outer circumference shape of the hub 30C is an exact circle when seen from a rotation central line direction running through the rotation center C. The rotation center C is shifted to the side opposite to the opening 22 of the wheel plate 20A with respect to the center C2 of the hub 30C.

The central hole 31 of the hub 30C is disposed with the rotation center C as a center for its function.

By shifting the rotation center C from the center C2 of the hub 30C, an outer circumference portion which is located farther from the rotation center C than the other portion of the outer circumference of the hub 30C is formed on the opening 22 side of the wheel plate 20A in the hub 30C. The outer circumference portion functions as the center-of-gravity adjuster 34C.

In such a way, the fluorescent wheel 10C forms a center-of-gravity adjuster 34C on the opening 22 side of the wheel plate 20A in the hub 30C by shifting the rotation center C from the center C2 of the hub 30C. The center-of-gravity adjuster 34C is provided between flat surfaces of the front and back surfaces of the hub 30C, and has a structure not generating unevenness.

Thus, the center of gravity of the fluorescent wheel 10C can be located on or closer to the rotation center C, and it is possible to effectively reduce the generation of vibration at the time of rotation and obtain silence.

Since the above effect can be achieved only by shifting the rotation center C, the hub 30C can be formed from a circular plate of an exact circle. Thus, it is possible to provide the fluorescent wheel 10C which can be produced easily.

The rotation center C may be shifted toward the opening 22 side of the wheel plate 20A with respect to the center of the holding plate 40, not the hub 30C. Alternatively, the rotation center C may be shifted toward the opening 22 side of the wheel plate 20A with respect to both of the hub 30C and the holding plate 40.

Figure 7:
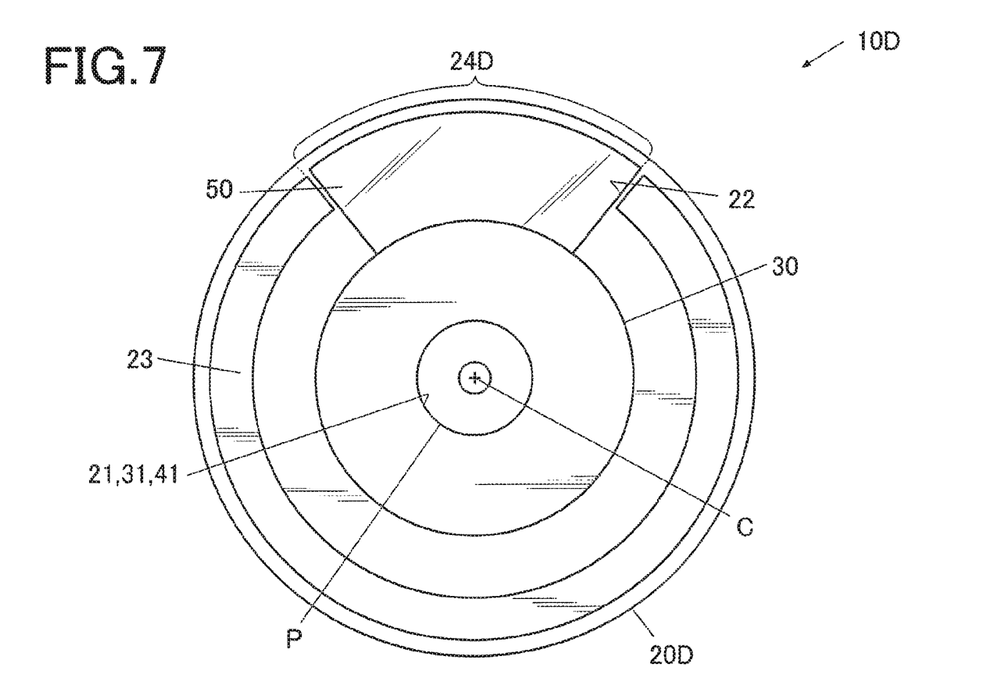
FIG. 7 is a front view of a fluorescent wheel according to a modification example of the embodiment.

FIG. 7 shows a plan view of a fluorescent wheel 10D as a wheel member that is a modification example of the embodiment.

As for the fluorescent wheel 10D, the difference from the above-mentioned fluorescent wheels 10 to 10C will be mainly described, and same reference numerals are provided to same parts to avoid repetition of the description.

The fluorescent wheel 10D includes a wheel plate 20D in which a central hole 21 and an opening 22 are formed, a hub 30, a holding plate 40 and a diffusion plate 50 (illustration of the holding plate 40 is omitted in FIG. 7).

The outer circumference shape of the wheel plate 20D is an exact circle with the rotation center C as a center.

Furthermore, the part on the opening 22 side in the outer circumference of the wheel plate 20D is formed of a material such as metal having a large density compared to the density of the portion other than the part, and the part having the large density is a center-of-gravity adjuster 24D. The center-of-gravity adjuster 24D is provided between the flat surfaces of the front and back surface of the wheel plate 20D, and has a shape not generating unevenness.

By having the center-of-gravity adjuster 24D formed of a material having a large density on the opening 22 side with respect to the rotation center C of the wheel plate 20D, the center of gravity of the fluorescent wheel 10D can be located on or closer to the rotation center C, and it is possible to effectively reduce the generation of vibration at the time of rotation and obtain silence.

Since the above effect can be achieved by changing apart of the material, the wheel plate 20D can be formed from a circular plate of an exact circle. Thus, it is possible to provide the fluorescent wheel 10D which can be produced easily.

Figure 8:
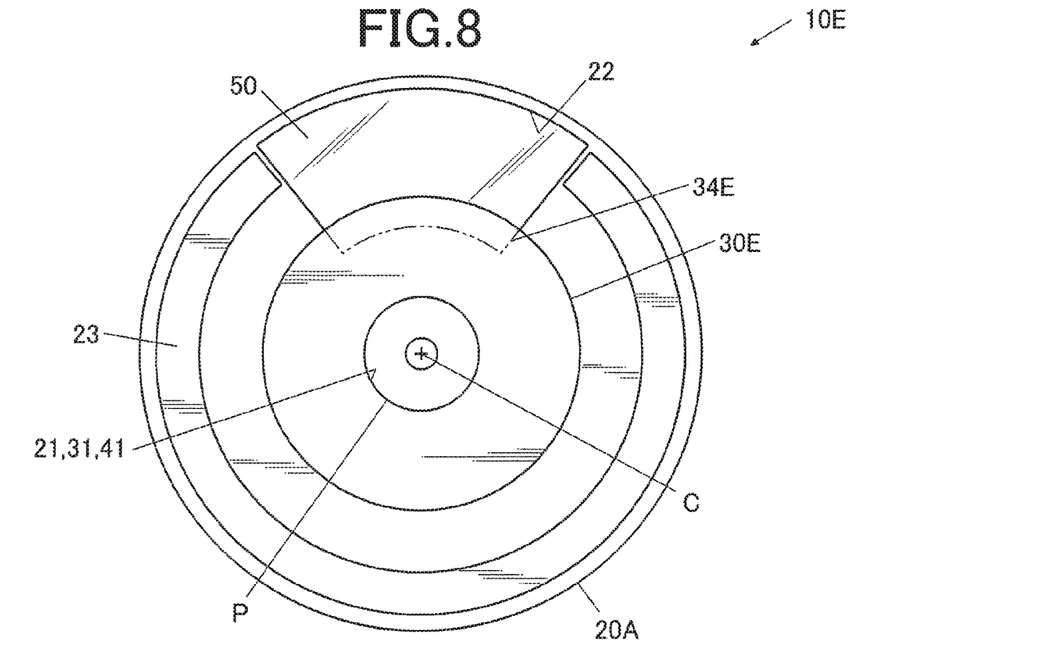
FIG. 8 is a front view of a fluorescent wheel according to a modification example of the embodiment.

FIG. 8 shows a plan view of a fluorescent wheel 10E as a wheel member that is a modification example of the embodiment.

As for the fluorescent wheel 10E, the difference from the above-mentioned fluorescent wheels 10 to 10D will be mainly described, and same reference numerals are provided to same parts to avoid repetition of the description.

The fluorescent wheel 10E includes a wheel plate 20A, a hub 30E as a circular plate mounted on one surface of the wheel plate 20A, a holding plate 40 and a diffusion plate 50 (illustration of the holding plate 40 is omitted in FIG. 8).

The outer circumference shape of the hub 30E is an exact circle with the rotation center C as a center.

Furthermore, the part on the opening 22 side of the wheel plate 20A in the outer circumference of the hub 30E is formed of a material such as metal having a large density compared to the density of the portion other than the part, and the part having the large density is a center-of-gravity adjuster 34E. The center-of-gravity adjuster 34E is provided between the flat surfaces of the front and back surface of the hub 30E, and has a structure not generating unevenness.

By having the center-of-gravity adjuster 34E formed of a material having a larger density than the other portion of the hub 30E on the opening 22 side of the wheel plate 20A in the outer circumference of the hub 30E, the center of gravity of the fluorescent wheel 10E can be located on or closer to the rotation center C, and it is possible to effectively reduce the generation of vibration at the time of rotation and obtain silence.

Since the above effect can be achieved by changing apart of the material, the wheel plate 20A and the hub 30E can be formed from a circular plate of an exact circle. Thus, it is possible to provide the fluorescent wheel 10E which can be produced easily.

The center-of-gravity adjuster formed of a material having a larger density than that of the other portion may be formed on the opening 22 side of the wheel plate 20A in outer circumference of the holding plate 40, not the hub 30E. Alternatively, the center-of-gravity adjuster formed of a material having a large density may be formed with respect to both of the hub 30E and the holding plate 40.

Figure 9:
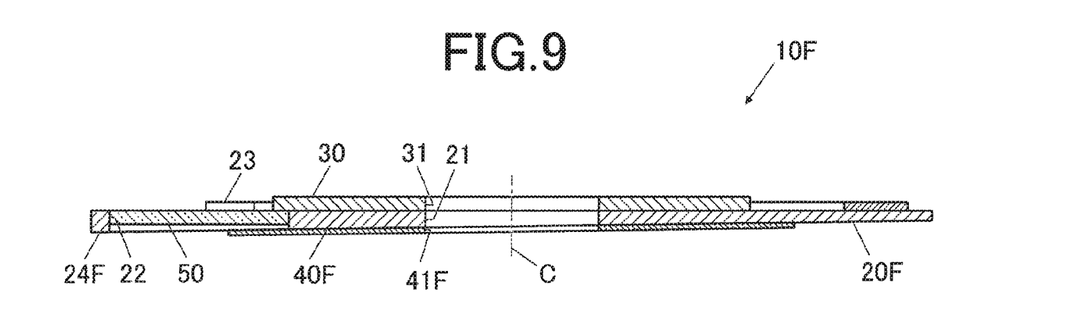
FIG. 9 is a sectional view along a rotation central line of a fluorescent wheel according to a modification example of the embodiment.

FIG. 9 shows a sectional view along a rotation central line running through the rotation center C of a fluorescent wheel 10F as a wheel member that is a modification example of the embodiment.

As for the fluorescent wheel 10F, the difference from the above-mentioned fluorescent wheels 10 to 10E will be mainly described, and same reference numerals are provided to same parts to avoid repetition of the description.

The fluorescent wheel 10F includes a wheel plate 20F in which a central hole 21 and an opening 22 are formed, a hub 30, a holding plate 40F and a diffusion plate 50.

The wheel plate 20F is an exact circle when seen from the rotation central line direction running through the rotation center C. The wheel plate 20F includes a center-of-gravity adjuster 24F which has a structure of gradually increasing the thickness of the wheel plate 20F in the direction from the opposite side to the opening 22 toward the opening 22 side across the rotation center C. The center-of-gravity adjuster 24F is provided between flat surfaces of the front and back surfaces of the wheel plate 20F, and has a structure not generating unevenness.

That is, in this wheel plate 20F, the front surface is a flat surface perpendicular to the rotation central line, whereas the back surface has an inclined flat surface which is inclined so that the end opposite to the opening 22 is thinnest and the end on the opening 22 side is thickest.

The holding plate 40F is a parallel flat plate, but disposed on the inclined flat surface of the wheel plate 20F as mentioned above. Thus, the central hole 41F is formed to penetrate in the direction inclined with respect to the flat plate surface.

In such a way, the fluorescent wheel 10F forms a center-of-gravity adjuster 24F in the wheel plate 20F by having a structure of gradually increasing the thickness of the wheel plate 20F in the direction from the side opposite to the opening 22 toward the opening 22 side across the rotation center C.

Thus, the center of gravity of the fluorescent wheel 10F can be located on or closer to the rotation center C, and it is possible to effectively reduce the generation of vibration at the time of rotation and obtain silence.

Since the above effect can be achieved by only forming the inclined surface in the wheel plate 20F, it is possible to provide the fluorescent wheel 10F which can be produced easily.

Figure 10:
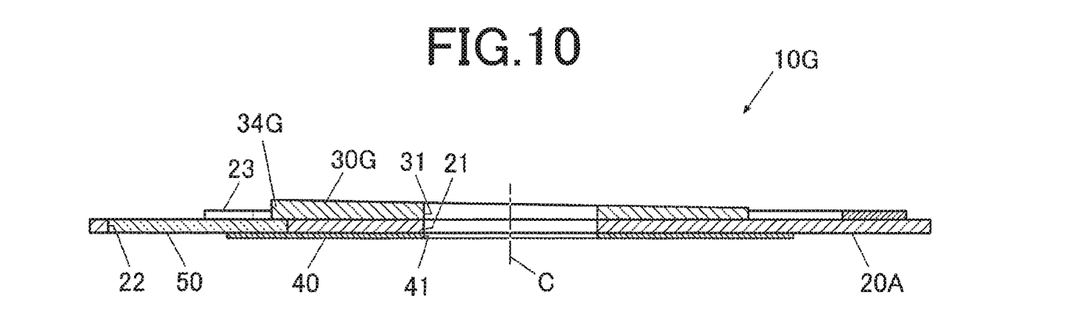
FIG. 10 is a sectional view along a rotation central line of a fluorescent wheel according to a modification example of the embodiment.

FIG. 10 shows a sectional view along a rotation central line running through the rotation center C of a fluorescent wheel 10G as a wheel member that is a modification example of the embodiment.

As for the fluorescent wheel 10G, the difference from the above-mentioned fluorescent wheels 10 to 10F will be mainly described, and same reference numerals are provided to same parts to avoid repetition of the description.

The fluorescent wheel 10G includes a wheel plate 20A in which a central hole 21 and an opening 22 are formed, a hub 30G, a holding plate 40 and a diffusion plate 50.

The outer circumference shape of the hub 30G is an exact circle when seen from the rotation central line direction running through the rotation center C. The hub 30G includes a center-of-gravity adjuster 34G which has a structure of gradually increasing the thickness of the hub 30G in the direction from the opposite side to the opening 22 of the wheel plate 20A toward the opening 22 side across the rotation center C. The center-of-gravity adjuster 34G is provided between flat surfaces of the front and back surfaces of the hub 30G, and has a structure not generating unevenness.

That is, in this hub 30G, the back surface is a flat surface perpendicular to the rotation central line, whereas the front surface has an inclined flat surface which is inclined so that the end opposite to the opening 22 of the wheel plate 20A is thinnest and the end on the opening 22 side is thickest.

The central hole 31 of the hub 30G is formed to penetrate in the direction perpendicular to the back surface of the hub 30G.

In such a way, the fluorescent wheel 10G forms a center-of-gravity adjuster 34G by having a structure of gradually increasing the thickness of the hub 30G in the direction from the side opposite to the opening 22 of the wheel plate 20A toward the opening 22 side across the rotation center C.

Thus, the center of gravity of the fluorescent wheel 10G can be located on or closer to the rotation center C, and it is possible to effectively reduce the generation of vibration at the time of rotation and obtain silence.

Since the above effect can be achieved by only forming the inclined surface in the hub 30G, it is possible to provide the fluorescent wheel 10G which can be produced easily.

There may be formed a center-of-gravity adjuster formed of a structure of gradually increasing the thickness of the holding plate 40 in the direction from the side opposite to the opening 22 of the wheel plate 20A toward the opening 22 side across the rotation center C in the holding plate 40, not the hub 30G. Alternatively, there may be formed a center-of-gravity adjuster of the above structure with respect to both of the hub 30G and the holding plate 40.

Though a fluorescent wheel has been illustrated as a wheel member in the embodiment, the wheel member is not limited to this. For example, above-mentioned center-of-gravity former can be applied to a color wheel or the like which forms a plurality of colorless or colored transmitters arranged along the circumference direction, and provides colors by transmitting light emitted from a light source.

Embodiments to which the present embodiment can be applied are not limited to the above-mentioned embodiment, and modifications can be made as needed within the scope of the present embodiment.

For example, it is possible to omit the hub 30 or the holding plate 40, 40F in a case where the diffusion plate 50 can be fixed to the wheel plate 20 to 20F without using the hub 30 or the holding plate 40, 40F, and the hub 30 or the holding plate 40, 40F does not have a center-of-gravity adjuster.

Though there has been illustrated a configuration in which the wheel plate 20 to 20F holds the diffusion plate 50 and includes a fluorescent layer 23, the wheel plate 20 to 20F may be formed of two plates that are a wheel plate holding the diffusion plate 50 and a wheel plate including the fluorescent layer 23. In such a case, the center-of-gravity adjuster may be provided to only one wheel plate or may be provided to both of wheel plates.

The color of excitation light and the color of the fluorescent light emitted from the fluorescent layer 23 are examples, and may be other colors. For example, it is preferable that the color of excitation light and the color of fluorescent light emitted from the fluorescent layer 23 are three primary colors of light, and are different from each other.

Though the above embodiment has been described by illustrating the diffusion plate 50 which transmits the excitation light so as to be diffused as a transmitting member, the shapes and structural features described in the above-mentioned embodiments can be applied even to a case of using, for the fluorescent wheel, a transmitting member formed of a transmitting material such as a glass plate not having a diffusion function.

In the embodiment of FIG. 1, the position of center of gravity is adjusted by providing the center-of-gravity adjuster 24 at a position farther from the rotation center than the other outer circumference portion in the outer circumference on the opening 22 side of the fluorescent wheel 10. However, the adjustment is not limited to this, and the position of the center of gravity may be adjusted by locating the outer circumference portion on the side opposite to the opening 22 across the rotation center in the fluorescent wheel 10 to be closer to the rotation center than the other outer circumference portion.

The same also applies to a case of the hub 30A in the embodiment of FIG. 4.

What is claimed is:

1. A wheel member comprising:
    a diffusion plate; and
    a wheel plate which has a rotation central hole and an opening, the rotation central hole being a hole into which a rotation shaft is inserted, and the opening being provided to open over a predetermined angle range with respect to the rotation central hole and housing the diffusion plate,
    wherein an outer circumference shape of the wheel plate is formed to be an exact circle on a side opposite to a side where the opening is located with respect to the rotation central hole, and the outer circumference shape of the wheel plate is formed to be an oval on the side where the opening is located, and
    wherein a region which is formed to be the oval in the wheel plate is formed as a center-of-gravity adjuster.

2. The wheel member according to claim 1, wherein the center-of-gravity adjuster is located farther from a rotation center than another portion in an outer circumference of the wheel plate.

3. The wheel member according to claim 1, wherein the wheel plate transmits or reflects light.

4. The wheel member according to claim 1, wherein the wheel plate is used in a rotating state.

5. The wheel member according to claim 1, wherein the center-of-gravity adjuster is provided as a part of a housing frame which forms the opening and houses the diffusion plate.

6. A projector comprising:
    a diffusion plate;
    a wheel plate which has a rotation central hole and an opening, the rotation central hole being a hole into which a rotation shaft is inserted, and the opening being provided to open over a predetermined angle range with respect to the rotation central hole and housing the diffusion plate; and
    a light source which emits excitation light to be emitted to the wheel plate,
    wherein an outer circumference shape of the wheel plate is formed to be an exact circle on a side opposite to a side where the opening is located with respect to the rotation central hole, and the outer circumference shape of the wheel plate is formed to be an oval on the side where the opening is located, and
    wherein a region which is formed to be the oval in the wheel plate is formed as a center-of-gravity adjuster.

* * * * *